United States Patent [19]

Bukowski et al.

[11] 4,394,262

[45] Jul. 19, 1983

[54] SYSTEM FOR MINIMIZING BACKWASH WATER USAGE ON SELF-CLEANING STRAINERS

[75] Inventors: Ronald G. Bukowski; Timothy L. Johnson, both of Erie, Pa.

[73] Assignee: Zurn Industries, Inc., Erie, Pa.

[21] Appl. No.: 406,580

[22] Filed: Aug. 6, 1982

[51] Int. Cl.³ ............................................. B01D 29/38
[52] U.S. Cl. .................................. 210/103; 210/108; 210/138
[58] Field of Search ............... 210/103, 108, 138, 139

[56] References Cited

U.S. PATENT DOCUMENTS

| | | | |
|---|---|---|---|
| 1,984,302 | 12/1934 | De Vaies | 210/139 X |
| 4,005,013 | 1/1977 | Hinton | 210/138 X |
| 4,151,086 | 4/1979 | Frosch | 210/108 |
| 4,154,677 | 5/1979 | Mantell | 210/138 X |

Primary Examiner—John Adee
Attorney, Agent, or Firm—Webb, Burden, Robinson & Webb

[57] ABSTRACT

An automatic backwashing strainer system is provided for cleaning a strainer with a minimum amount of backwash water. The system includes a long time mode and a short time mode of operation in which the backwashing operation is conducted periodically with a variable duration and a variable cycle time. The system also includes a differential pressure mode of operation in which the backwashing is conducted whenever the pressure drop across the strainer exceeds a predetermined upper limit and continues for a variable time delay after the pressure drop reaches a predetermined lower limit. The particular durations, cycle times, time delays, and modes utilized to control the backwashing are selected in response to the operating conditions of the strainer system.

8 Claims, 4 Drawing Figures

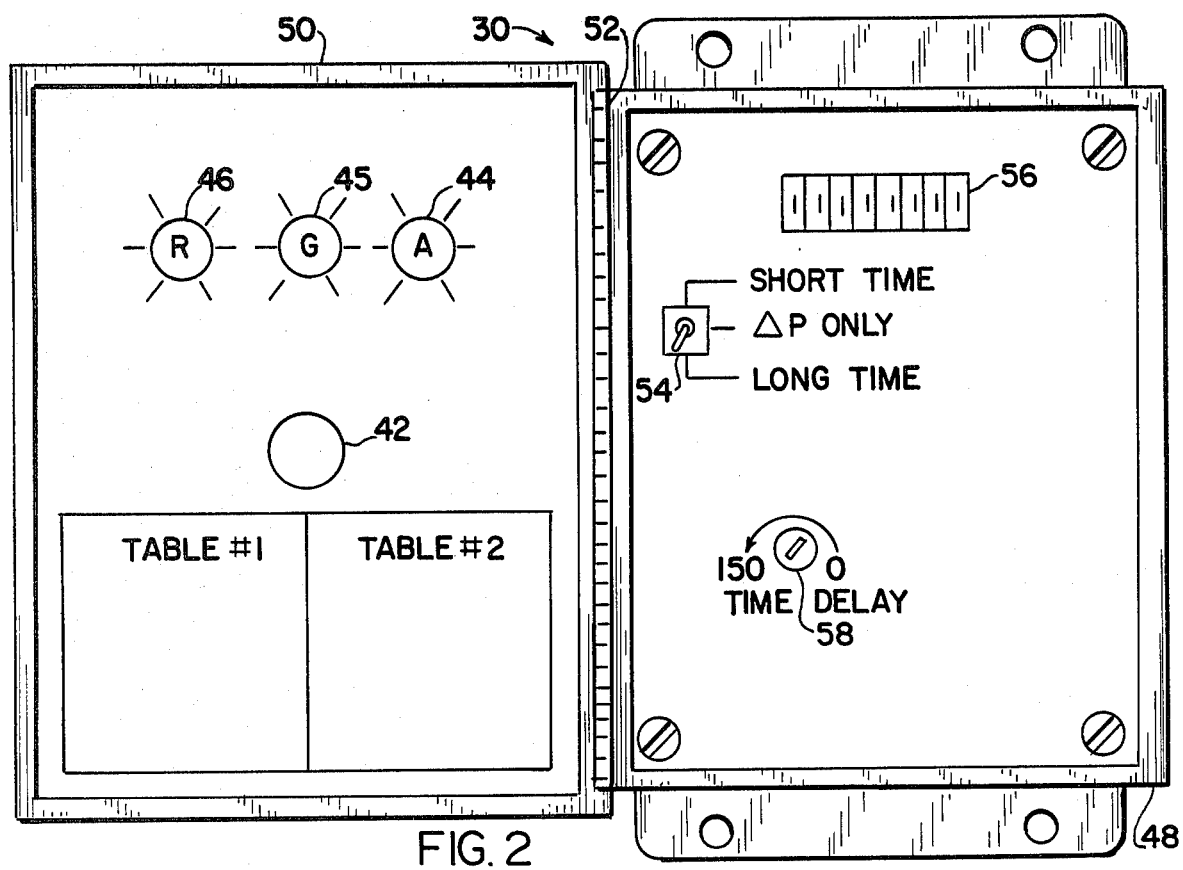
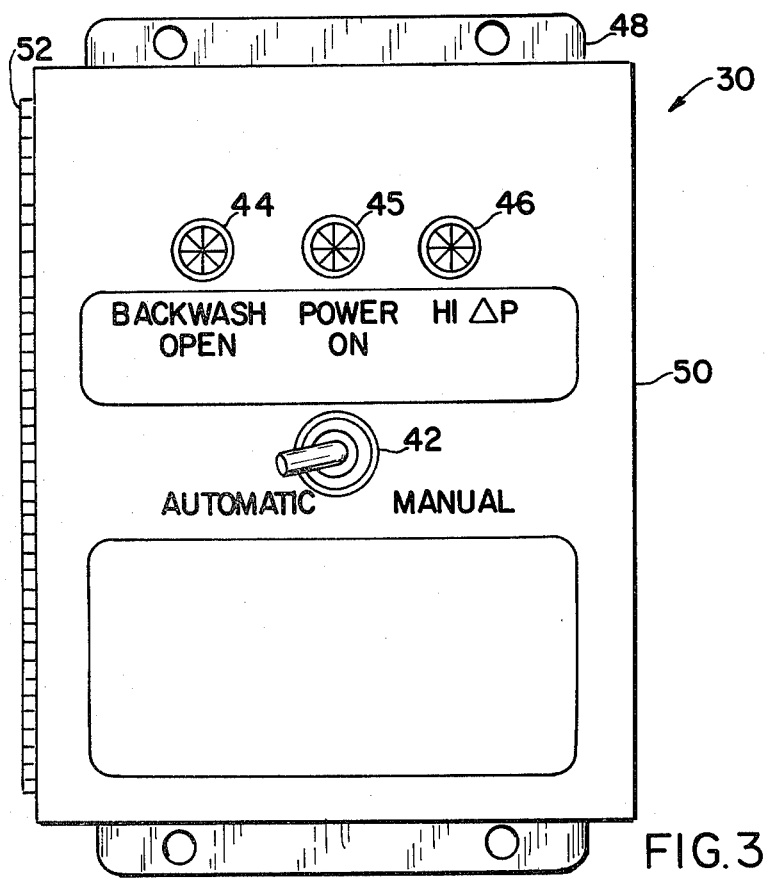
FIG. 2
FIG. 3

SYSTEM FOR MINIMIZING BACKWASH WATER USAGE ON SELF-CLEANING STRAINERS

FIELD OF THE INVENTION

Our invention pertains to automatic self-cleaning strainers and, more particularly, to control systems for automatic self-cleaning strainers which minimize the amount of backwash water used to clean the strainer.

BACKGROUND ART

Fluid strainers have been employed for many years in which accumulated solids or sedimentation from the fluid is collected on a screening media and thereafter removed from the screening media by means of a hollow backwash arm in which a portion of the strained fluid or a different fluid from an external source is caused to flow in a reverse direction through the screening media. See, for example, U.S. Pat. Nos. 3,256,995, 4,315,820 and 4,328,103. Typical applications of such automatic self-cleaning strainers include removing unwanted debris from water, waste water and other fluid straining applications throughout industrial, utility, nuclear, petrochemical, commercial and municipal operations. These strainers may also be used in closed or open fluid systems. For example, air conditioning systems used in cooling tall buildings may operate during the day as a closed system, but may operate at night as an open system while the cooling water is directed through a cooling tower and exposed to cooler air as it passes over a cooling grill. The water may become dirty from the air, birds, leaves, or the like when the air conditioning system is operating as an open system.

To ensure that the screening media remains unclogged, backwashing could be operated continuously. However, continuous backwashing is not economical because far too much backwash water would be utilized, thus reducing the efficiency of the overall system. In addition, the added energy to continuously backwash is wasteful. It has been recognized in the art that less than continuous backwashing is desirable.

The two known methods of operating the backwashing in an automatic self-cleaning strainer are a timed method and a differential pressure sensing method. In the timed method, the backwashing mechanism is operated periodically for a certain time duration. In prior art systems, this timed method has included only one duration and one cycle time, the most typical of which is backwashing for three minutes out of every ten minutes. In the differential pressure sensing method the pressure drop across the strainer is monitored. As the strainer becomes clogged, less and less fluid can flow therethrough and, thus, the pressure drop across the strainer increases. When the pressure drop across the strainer exceeds a predetermined upper limit, the backwashing operation is initiated and is continued until the pressure drop across the strainer is reduced to a predetermined lower limit. Recognizing that removed debris may remain adjacent the screening media, the prior art has taught that it is desirable to continue the backwashing operation for a certain time delay past the point in time that the pressure drop reaches the lower limit. Backwashing for this extra time delay prevents the screening media from becoming immediately blocked again by debris which has not been completely removed from the strainer. The prior art systems have included a fixed time delay period for this extra backwashing, typically sixty seconds.

Usually both the timed method and the differential pressure method of operating a backwash control system are utilized together.

A disadvantage to the prior art systems described above is that the duration and cycle time of the timed backwash operation, and the time delay of the differential pressure backwash operation, are fixed and may not be appropriate for the particular system operating conditions. Much backwash water and energy may be wasted if the conditions required a smaller amount of water to clean the screening media.

Accordingly, it is an object of the present invention to provide an automatic, self-cleaning straining system in which the backwash operation can be adjusted in accordance with the operating conditions of the system.

It is another object of the present invention to provide a backwashing control system in which a minimum amount of backwash water and energy consumption is used to clean the screening media.

SUMMARY OF THE INVENTION

Therefore, we have invented a control system for an automatic backwashing strainer which can be adjusted in response to the operating conditions of the system and which utilizes a minimum amount of backwash water and energy consumption. The control system includes a first and second timer which periodically produces a first and second control signal, respectively, for a variable duration and with a variable cycle time. The duration of the second control signal is shorter than the duration of the first control signal and the cycle time of the second control signal is longer than the cycle time of the first control signal. The control system also includes a latch responsive to a differential pressure switch which produces a third control signal whenever the pressure drop across the strainer exceeds a predetermined upper limit and maintains the third control signal for a variable time delay after the pressure drop reaches a predetermined lower limit.

The durations and cycle times of the first and second control signals are preferably adjusted by a plurality of selector switches connected to the timers and the time delay may be adjusted by a time delay switch connected to the latch. The control system also includes a means, preferably a three position switch, for selecting one or more of the control signals for activating an actuator connected to a backwash valve.

The cycle time and duration of the first control signal ranges from five to seventy-five minutes and from 6.25 to 100% of the cycle time, respectively, the cycle time and duration of the second control signal ranges from five to seventy-five minutes and from seven to ninety-eight seconds, respectively, and the time delay ranges from 0 to 150 seconds.

The cycle times and duration of the first and second control signals, the time delay of the third control signal, and which control signals operate the backwash valve actuator are selected in response to the operating conditions of the backwashing strainer system. A flow meter connected to the discharge end of the backwash valve and a chart recorder monitoring the control signals and the operation of the backwash valve may be used to indicate certain operating conditions of the strainer system.

BRIEF DESCRIPTION OF THE DRAWINGS

FIG. 2 is a front elevational view of the control panel shown in FIG. 1 with the door open;

FIG. 3 is a front elevational view of the control panel shown in FIG. 2 with the door closed.

DETAILED DESCRIPTION OF THE PREFERRED EMBODIMENTS

Figure 1:
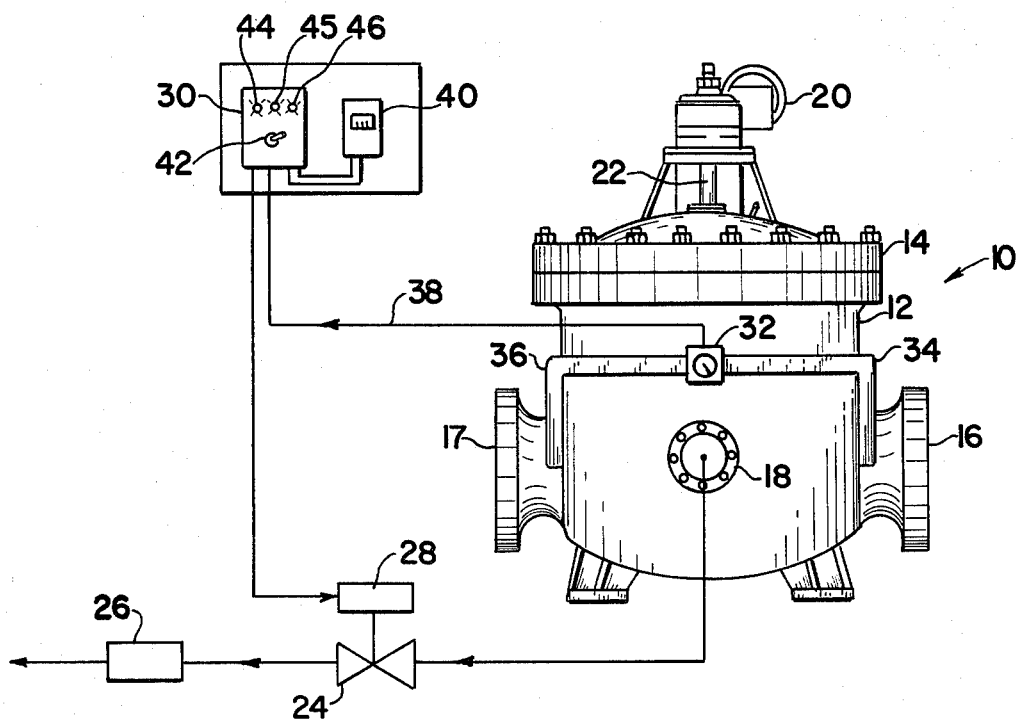
FIG. 1 is a front elevational view of an automatic backwashing strainer with a control system in accordance with the present invention.

An automatic backwashing strainer system in accordance with the present invention is shown in FIG. 1. The system includes a backwash strainer 10 which includes a strainer body 12, a cover 14 mounted to the body 12, and an inlet 16, an outlet 17 and a backwash outlet 18 all passing through the body 12. A motor 20 is attached to the cover 14 of the strainer 10 and rotates a shaft 22 which is connected to a hollow backwash arm located inside of the strainer 10. As is well known in the art, the backwash arm is located adjacent the screening media or straining element of the strainer 10 and functions to direct a portion of the main fluid flow back through the straining element, down the backwash arm, and out of the strainer 10 through the backwash outlet 18. As the backwash arm is rotated, material accumulated on the entire straining element is cleaned off without interrupting the main fluid flow through the strainer 10.

The flow of fluid through the backwash outlet 18 is controlled by a backwash valve 24 connected thereto. The backwash valve 24 is opened and connects the backwash outlet 18 to a pressure lower than the pressure of the main fluid flow, preferably to atmospheric pressure, thereby enabling the fluid to be redirected through the backwash arm and out the backwash outlet 18. The water which flows through the backwash valve 24, referred to as the backwash water, is rather dirty and is not used again in the system. The amount of backwash water utilized in cleaning the strainer 10 is a measure of the efficiency of the system, i.e., the more backwash water used in a given situation, the more inefficient the system, and vice versa. In order to monitor the amount of backwash water used, a flow meter 26 is provided at the discharge side of the backwash valve 24. The flow meter 26 indicates how efficiently the system is operating and indicates when fluid should be added to a closed system which has lost fluid from the backwashing operation.

The backwash valve 24 is controlled by an actuator 28 connected thereto. The actuator 28 may be electrical or pneumatic as is known in the art. In a preferred embodiment, the backwash valve 24 is a resilient seat butterfly valve and the actuator 28 functions to rotate a stem connected to a butterfly valve disk, and thus open and close the backwash valve 24. The actuator 28 is controlled by a signal from a control panel 30. As will be described hereinafter in more detail, the control panel 30 includes three different modes of operation for the actuator 28. In two of these modes, a timer supplies a periodic control signal to the actuator. In the third mode, the actuator 28 is turned on whenever the pressure drop across the strainer 10 exceeds a predetermined upper limit. Such a condition typically exists when the strainer 10 becomes clogged with debris and restricts the fluid flow therethrough.

To effectuate this third mode, referred to as the differential pressure mode, an adjustable differential pressure switch 32 is mounted on the strainer 10. An inlet pick-up pipe 34 extends between the differential pressure switch 32 and the strainer inlet 16. A similar outlet pick-up pipe 36 extends between the differential pressure switch 32 and the strainer outlet 17. The differential pressure switch 32 includes a pressure sensor which is responsive to the difference in pressure in the pick-up pipes 34, 36. If the pressure difference exceeds a predetermined upper limit, the differential pressure switch 32 generates a control signal which is supplied to the control panel 30 via cable 38. The control panel 30 responds by activating the actuator 28 to commence the backwash operation. As the strainer 10 becomes cleaner, the difference in the pressure across the strainer 10 gradually decreases to a predetermined lower limit, at which point the differential pressure switch 32 will stop producing a control signal. However, in order to ensure that the strainer 10 will not become quickly clogged by debris present inside of the backwash arm and backwash outlet 18, the control panel 30 will continue to activate the actuator 28 for a variable time delay after the pressure drop across the strainer 10 reaches the lower limit. In a typical system, the upper limit for the pressure drop across the strainer 10 is set at 3 psi and the lower limit is 1.5 psi, the amount of pressure drop created by the strainer itself.

An event recorder 40 is connected to the control panel 30 and monitors various operating conditions in the backwashing system. The control panel 30 also includes a two position switch 42 which operates to switch the system between an automatic mode, wherein the backwash valve 24 is controlled by the control panel 30, or a manual mode, wherein the control panel 30 is by-passed and the backwash valve 24 is opened continuously. The control panel 30 may also include indicator lights 44, 45, and 46 which light whenever the backwash valve 24 is open, the power is on, or the differential pressure switch 32 is activated, respectively.

The control panel 30 itself is shown in more detail in FIGS. 2 and 3. The control panel 30 includes a base 48 with a door 50 mounted thereto by a hinge 52. The indicator lights 44, 45, and 46 and the two position switch 42 discussed above are mounted on the outside of the door 50 and are the only elements of the control panel 30 visible when the door 50 is closed.

As mentioned above, the control panel 30 includes three different modes for operating the actuator 28. The first mode of operation is referred to as the long time mode. In this mode, a periodic signal is supplied to the actuator 28 with a variable cycle time and for a variable duration, with a generally short cycle time and a long duration. The long time mode is used to clean extremely dirty or difficult backwash applications which require more water for a longer period of time to remove the debris from the straining element, such as with a sticky material. An example of the long time mode is a three minute duration and a ten minute cycle time. The second mode of operation is referred to as the short time mode. In the short time mode, as with the long time mode, a periodic signal is supplied to the actuator 28 with a variable cycle time and for a variable duration. However, the cycle time in the short time mode is generally longer than in the long time mode while the duration is generally shorter. The short time mode is used once a system has been cleaned up and prevents the residual build-up of material on the straining element. An example of the short time mode is a twenty second duration and a sixty minute cycle time. The third mode of operation is referred to as the differential pressure mode. This mode was discussed above in connection with the differential pressure switch 32 shown in FIG. 1.

The mode of operation desired may be made by using the three position mode selector switch 54 located on the base 48 of the control panel 30. The three position switch 54 is operable to select one of three different operating conditions: (1) The long time mode, with a differential pressure mode override, (2) The short time mode, with a differential pressure mode override, and (3) The differential pressure mode only. Although the short time and long time modes could be used alone, it is better to always include the differential pressure mode in case the straining element suddenly becomes severely clogged in the middle of a short or long time cycle.

The particular cycle time and duration for the short time and long time modes may be chosen by way of a plurality of selector switches 56, such as rocker switches, located on the base 48. While eight selector switches 56 are shown in FIG. 2, the number utilized in any situation will depend on the particular device chosen to generate the control signals in the short and long time modes and the variability in duration and cycle time desired. In the control panel 30 shown in FIG. 2, one set of selector switches 56 is utilized to set the cycle time and duration for both the short and long time modes because, in the preferred embodiment of the system, only one of these modes is operated at a time.

The first four of the selector switches 56 are used to set the cycle time and the remaining switches 56 are used to set the duration. Table I below sets forth the switch settings for the available cycle times and durations in the long time mode and Table II sets forth the same information for the short time mode. This information is also printed on the inside of the door 50 so that an operator can readily set the selector switches 56 as desired.

TABLE I

| SWITCH # | | | | CYCLE TIME MINUTES | SWITCH # | | | | DURATION % OF CYCLE TIME |
|---|---|---|---|---|---|---|---|---|---|
| 1 | 2 | 3 | 4 | | 5 | 6 | 7 | 8 | |
| NOT ALLOWED | | | | | ALL OFF | | | | 6.25% |
| X | | | | 5 | X | | | | 12.5 |
| | X | | | 10 | | X | | | 18.75 |
| X | X | | | 15 | X | X | | | 25. |
| X | | X | | 25 | X | | X | | 37.5 |
| | X | X | | 30 | | X | X | | 43.75 |
| X | X | X | | 35 | X | X | X | | 50. |
| | | | X | 40 | | | | X | 56.25 |
| X | | | X | 45 | X | | | X | 62.5 |
| | X | | X | 50 | | X | | X | 68.75 |
| X | X | | X | 55 | X | X | | X | 75. |
| | | X | X | 60 | | | X | X | 81.25 |
| X | | X | X | 65 | X | | X | X | 87.5 |
| | X | X | X | 70 | | X | X | X | 93.75 |
| X | X | X | X | 75 | X | X | X | X | 100% |

X = Switch in ON Position

TABLE II

| SWITCH # | | | | CYCLE TIME MINUTES | SWITCH # | | | | DURATION SECONDS |
|---|---|---|---|---|---|---|---|---|---|
| 1 | 2 | 3 | 4 | | 5 | 6 | 7 | 8 | |
| NOT ALLOWED | | | | | ALL OFF | | | | 7 |
| X | | | | 5 | X | | | | 7 |
| | X | | | 10 | | X | | | 14 |
| X | X | | | 15 | X | X | | | 21 |
| X | | X | | 25 | | | X | | 28 |
| | X | X | | 30 | X | | X | | 35 |
| X | X | X | | 35 | | X | X | | 42 |
| | | | X | 40 | X | X | X | | 49 |
| X | | | X | 45 | | | | X | 56 |
| | X | | X | 50 | X | | | X | 63 |
| X | X | | X | 55 | | X | | X | 70 |
| | | X | X | 60 | X | X | | X | 77 |
| X | | X | X | 65 | | | X | X | 84 |
| | X | X | X | 70 | X | | X | X | 91 |
| X | X | X | X | 75 | | X | X | X | 98 |

X = Switch in ON Position

As discussed above, in the differential pressure mode, the control panel 30 continues to activate the actuator 28 for a variable time delay after the pressure drop across the strainer 10 reaches the predetermined lower limit. This time delay may be set by means of a time delay switch 58 located on the base 48. As shown in FIG. 2, the time delay switch 58 is adapted to vary the time delay between 0 and 150 seconds.

Figure 4:
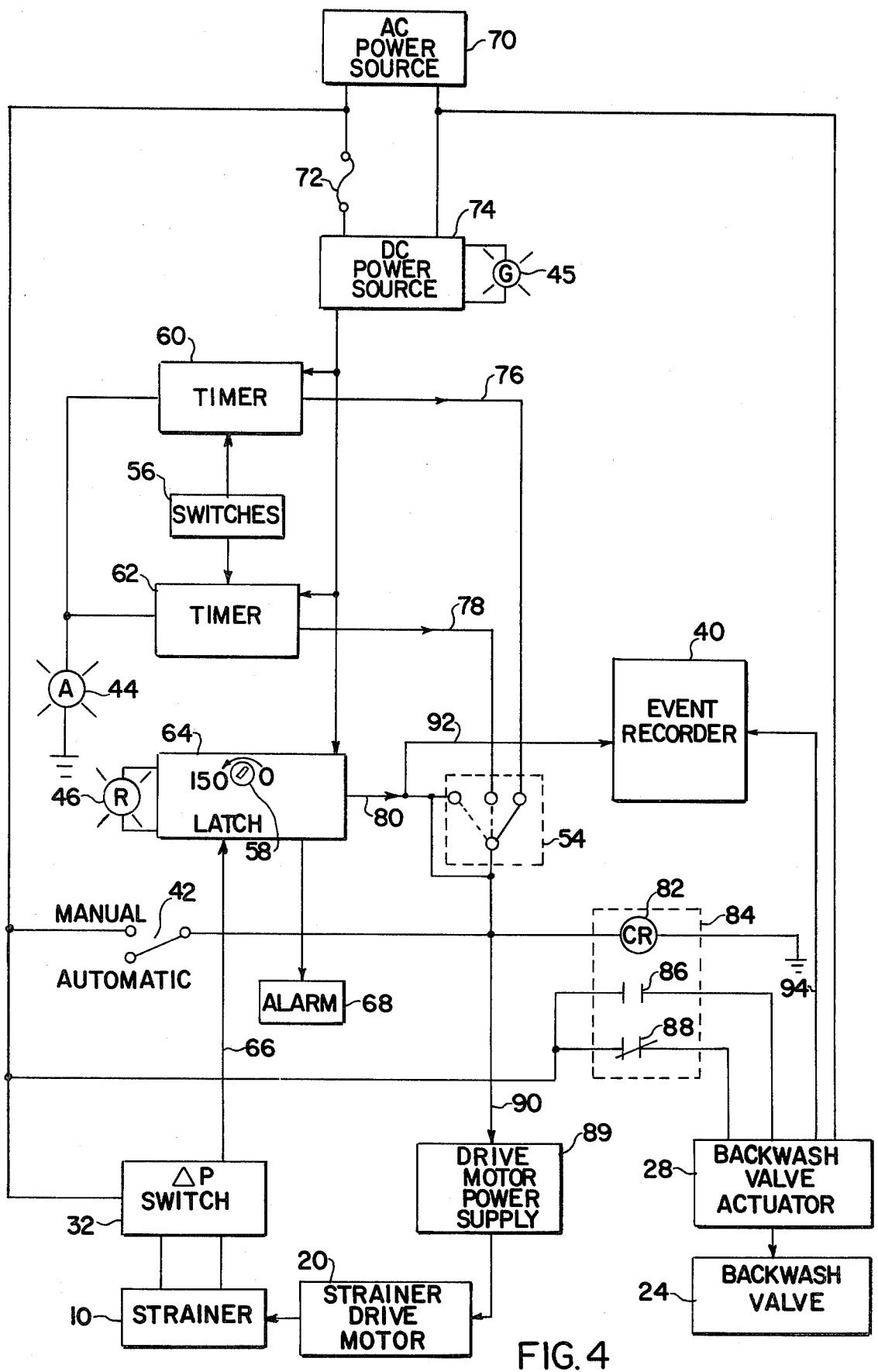
FIG. 4 is a block diagram of the backwashing strainer system of the present invention.

A block diagram of a control circuit adapted to generate the three operational modes of the control panel 30 is shown in FIG. 4. The circuit includes a first timer 60 which periodically produces a first control signal for the long time mode for a variable duration and with a variable cycle time. The circuit also includes a second timer 62 which periodically produces a second control signal for the short time mode for a variable duration and with a variable cycle time. The selector switches 56 are connected to both the first timer 60 and second timer 62 and adjust the duration and cycle time of the first and second control signals, respectively, as discussed above. Indicator light 44, connected to both the first timer 60 and second timer 62, will light whenever either timer is producing a control signal and indicates that backwashing of the strainer 10 is occurring.

The control circuit also includes a latch 64 which is connected to the differential pressure mode. In response to the pressure drop across the strainer 10 exceeding a predetermined upper limit, the differential pressure switch 32 generates a differential pressure control signal which is supplied to the latch via cable 66. In response to the differential pressure control signal, the latch 64 begins to generate the third circuit signal, and then maintains the third control signal for a variable time delay after the pressure drop across the strainer reaches the predetermined lower limit, i.e. for a time delay after the differential pressure control signal ceases. The time delay of the latch 64 is adjustable, preferably, between 0 and 150 seconds by the time delay switch 58. Indicator light 46 is connected to the latch 64 and lights whenever the latch is generating the third control signal, thus indicating that backwashing is occurring as a result of a high pressure drop being detected across the strainer 10. The latch 64 may also be connected to an alarm 68 if it is desired to audibly or otherwise warn the operator that backwashing is occurring in the differential pressure mode.

An AC power source 70 is supplied through fuse 72 to a DC power source 74 which converts the AC power signal, typically 120 volt, 60 Hz, single phase, into a 24 volt DC signal. This DC signal is supplied to and powers the first timer 60, the second timer 62 and the latch 64. Preferably the timers 60, 62 and the latch 64 are standard solid state devices which require an external direct current power supply in order to operate. Indicator light 45 is connected to the DC power source 74 and lights whenever the DC power source 74 is operating.

The output of the first timer 60, referred to as the first control signal, the output of the second timer 62, the second control signal, and the output of the latch 64, the third control signal, are supplied, via cables 76, 78 and 80, respectively, to the input terminals of the three position mode selector switch 54. As determined by the position of switch 54, one of the first, second or third control signals will pass through switch 54. In the preferred embodiment, the third control signal, associated with the differential pressure mode of operation, is also supplied directly to the output of switch 54. In this manner a differential pressure mode back-up is provided to the first and second control signals, associated with the long time and short time modes of operation, respectively.

The output of the three position switch 54 is supplied to the coil 82 of a control relay 84 and operates normally open contact 86 and normally closed contact 88. Contacts 86 and 88 are used in connection with an electric backwash valve actuator 28. If a pneumatic actuator were utilized, only normally open contact 86 would be needed. When a control signal is transmitted from the three position switch 54, the coil 82 becomes energized and closes contact 86 and opens contact 88. Power is then supplied to the actuator 28 from the AC power source 70 through now closed contact 86 to activate the actuator 28 and open the backwash valve 24. When the control signal from switch 54 has ended, the coil is no longer energized and contact 86 returns to its normally open position while contact 88 returns to its normally closed position. Power is then supplied to the actuator 28 through contact 88 and the actuator functions to close the backwash valve.

The control system is normally operated in the automatic mode with the two position switch 42 open as shown in FIG. 4. If switch 42 is closed, power from the AC power source 70 is supplied directly to the coil 82 of the control relay 84 and the backwash valve 24 is opened as discussed above. Backwashing will occur continuously until switch 42 is opened again. Thus the system can be operated in an automatic or a manual mode as desired.

The strainer drive motor 20, which rotates the strainer backwash arm, is often operated continuously whether the backwash valve 24 is open or not. In order to save energy, the drive motor 20 could be operated only when the backwash valve 24 is opened. This may be accomplished by supplying the output signals from the three position switch 54 and the two position switch 42 to the drive motor power supply 89 via cable 90. In this manner, the drive motor 20 will begin to rotate the backwash arm only when the coil 82 is energized and the backwash valve 24 is opened.

As discussed above, the control system preferably includes an event recorder which monitors various signals in the control panel 30. In a preferred embodiment, the event recorder 40 is a two channel chart recorder. One channel receives the third control signal via cable 92 and measures the time and duration of backwashing initiated by the differential pressure mode. The other channel receives a signal from the backwash valve actuator 28 and measures the time and duration of backwashing initiated by any of the control modes, including the manual override mode associated with switch 42.

The various modes of operation, long time, short time, differential pressure, or manual override, as well as the duration and cycle time of the time modes and time delay of the differential pressure modes, can be selected in order to minimize backwashing by cleaning the strainer 10 with a minimum amount of backwash water. While these various selections are made by a human operator in the present invention, it is conceivable that the selections could be made by a properly constructed microprocessor circuit. The selections are made by the operation after considering a number of factors including the past history of the system as shown by the event recorder and the flow meter, the present operating condition of the system, and any changes in the system which are anticipated to occur in the future.

The chart recorder is particularly useful in establishing an operating schedule for the system. As an example, a high rise office building may use river water for cooling an air conditioning system. For twenty-two hours out of a twenty-four hour day, the strainer requires only a thirty second backwash every hour to keep itself clear of residual debris build-up. For this period, the short time mode would be used, with the duration and cycle time set appropriately. Between the hours of 5:00 P.M. and 7:00 P.M., a factory upstream dumps large amounts of sticky solids into the river. These solids tend to adhere to the straining element and require more backwash time to remove. During this period, the operator switches to the long time mode, sets the selector switches for backwashing at, say, fifteen minute cycles for three minutes out of every cycle in order that the strainer can contend with the increased solid loading. The differential pressure mode is always operating in case an unusual situation occurs severely clogging the strainer. By recording daily events of this nature, the operator can establish weekly, monthly, or yearly operating schedules for the system.

The savings in backwash water usage from the present invention can be quite significant. Applicants tested an operating system which included a 110 Hp pumping capacity and pumped 3,000 gallons per minute for forty hours. The total liquid pumped was 7,200,000 gallons. The differential pressure mode was tested using the standard fixed prior art time delay of sixty seconds. Applicants found that the strainer could be kept clean by having only a twenty second time delay. The total backwash water used in the prior art differential pressure mode was 49,680 gallons while the differential pressure mode in accordance with the present invention required only 16,560 gallons of backwash water, for a savings of 33,120 gallons. In the same test system, the time control mode was tested using the standard, fixed prior art backwash arrangement of a three minute duration out of a ten minute cycle time. The total backwash water usage with this arrangement was 162,000 gallons over the forty hour test. Applicants found that by using the control system of the present invention in the short time mode and backwashing for twenty seconds out of every hour, the strainer could be kept clean. Total backwash water usage for this arrangement was 3,000 gallons a significant savings over the 162,000 gallons used with the prior art system.

The market today has a demand for strainers with much finer screening elements which tend to clog rather easy. Sophisticated controls are required to keep such strainers clean without an inordinate amount of backwash time. Applicants' system satisfies the need for such a sophisticated control system, particularly with the short time mode. With a sophisticated control system a strainer designer can make a more closely designed piece of equipment without including a large built-in margin of error.

What is claimed is:

1. In an automatic backwashing strainer system including a backwashing strainer with a backwash outlet; a backwash valve for controlling the flow of backwash water through the backwash outlet; an actuator operating the backwash valve, and control means for automatically activating the actuation, the improvement in said control means comprising:
   (a) a first timer which periodically produces a first control signal for a variable duration and with a variable cycle time;
   (b) a second timer which periodically produces a second control signal for a variable duration and with a variable cycle time, wherein the duration of the second control signal is shorter than the duration of the first control signal and the cycle time of the second control signal is longer than the cycle time of the first control signal;
   (c) a differential pressure switch which produces a differential pressure signal whenever the pressure drop across the strainer exceeds a predetermined upper limit and maintains said differential pressure signal until said pressure drop reaches a predetermined lower limit;
   (d) a latch responsive to the differential pressure signal which produces a third control signal while the differential pressure switch is activated and which maintains the third control signal for a variable time delay after the pressure drop across the strainer reaches the predetermined lower limit;
   (e) means for varying the duration and cycle time of the first and second control signals;
   (f) means for varying the time delay of the third control signal; and
   (g) means for selecting, in response to operating conditions of the backwashing strainer system, one or more of said control signals to activate the actuator, such that the strainer is cleaned with a minimum usage of backwash water.

2. The improvement of claim 1 wherein said control means further includes a flow meter which measures the flow of backwash water through the backwash valve and an event recorder which records said control signals and records when said backwash valve is open.

3. The improvement of claim 2 wherein said event recorder includes two recording channels and records the third control signal on one channel and records when the backwash valve is open in the other channel.

4. The improvement of claim 1 wherein the means for varying the duration and cycle time of the first and second control signals is a plurality of selector switches connected to both the first timer and the second timer wherein the position of said selector swiches determines said durations and cycle times.

5. The improvement of claim 4 wherein the cycle of the first control signal ranges from five to seventy-five minutes, the duration of the first control signal ranges from 6.25 to 100% of the cycle time, the cycle time of the second control signal ranges from five to seventy-five minutes, and the duration of the second control signal ranges from seven to ninety-eight seconds, wherein the duration and cycle times are selected in response to the operating conditions of the backwashing strainer system.

6. The improvement of claim 1 wherein the means for varying the time delay of the third control signal is a time delay switch connected to said latch and adapted to vary the time delay between 0 and 150 seconds, wherein the time delay is selected in response to the operating conditions of the backwashing strainer system.

7. The improvement of claim 1 wherein the means for selecting said control signals is a three position switch adapted to pass one of said control signals at a time to the actuator as determined by the position of said three position switch.

8. The improvement of claim 7 wherein the third control signal is always supplied to the actuator.

* * * * *

UNITED STATES PATENT AND TRADEMARK OFFICE
CERTIFICATE OF CORRECTION

PATENT NO. : 4,394,262

DATED : July 19, 1983

INVENTOR(S) : Ronald G. Bukowski et al.

It is certified that error appears in the above-identified patent and that said Letters Patent are hereby corrected as shown below:

Column 6 Line 45

After "pressure" insert --switch 32 and produces a third control signal for the differential pressure--.

Signed and Sealed this

Twentieth Day of September 1983

[SEAL]

*Attest:*

GERALD J. MOSSINGHOFF

*Attesting Officer*     *Commissioner of Patents and Trademarks*